United States Patent
Nagami

(10) Patent No.: US 8,438,206 B2
(45) Date of Patent: May 7, 2013

(54) LINEAR FEEDBACK SHIFT CALCULATION APPARATUS, COMMUNICATION APPARATUS, MICROPROCESSOR, AND DATA OUTPUT METHOD IN A LINEAR FEEDBACK CALCULATION APPARATUS

(75) Inventor: Kohichi Nagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 12/572,318

(22) Filed: Oct. 2, 2009

(65) Prior Publication Data
US 2010/0098148 A1   Apr. 22, 2010

(30) Foreign Application Priority Data
Oct. 20, 2008 (JP) ................. 2008-269523

(51) Int. Cl.
*H03H 7/30* (2006.01)
*G06F 7/58* (2006.01)

(52) U.S. Cl.
USPC ............ 708/492; 708/250; 708/252; 708/400

(58) Field of Classification Search .............. 708/492, 708/250, 252, 400
See application file for complete search history.

(56) References Cited

U.S. PATENT DOCUMENTS

| | | | | |
|---|---|---|---|---|
| 4,574,361 | A * | 3/1986 | Inagawa et al. | 708/492 |
| 6,101,520 | A * | 8/2000 | Lan et al. | 708/492 |
| 6,665,692 | B1 * | 12/2003 | Nieminen | 708/250 |
| 7,487,194 | B2 * | 2/2009 | Lablans | 708/492 |
| 8,316,070 | B2 * | 11/2012 | Thackray | 708/252 |
| 2004/0078411 | A1 * | 4/2004 | Porten et al. | 708/492 |
| 2005/0094804 | A1 | 5/2005 | Nishijima et al. | |
| 2007/0168406 | A1 * | 7/2007 | Meyer | 708/252 |
| 2007/0271323 | A1 * | 11/2007 | Stein et al. | 708/492 |
| 2009/0138535 | A1 * | 5/2009 | Lablans | 708/252 |
| 2010/0268753 | A1 * | 10/2010 | Fujiwara et al. | 708/400 |

FOREIGN PATENT DOCUMENTS

| | | |
|---|---|---|
| JP | 8-167857 A | 6/1996 |
| JP | 9-190339 A | 7/1997 |
| JP | 2005-101753 | 4/2005 |

OTHER PUBLICATIONS

Hasan, M.A., et al., "Division and bit-serial multiplication over GF(qm)".*

* cited by examiner

*Primary Examiner* — Tammara Peyton
(74) *Attorney, Agent, or Firm* — Fujitsu Patent Center

(57) ABSTRACT

A linear feedback shift calculation apparatus, into which input data is input, and which outputs output data, including: an L generation unit which generates q values of $q_0$ to $q_{N-2}$ represented by:

$$q_k = \begin{cases} p_0 & (k=0) \\ p_k + \sum_{i=0}^{k-1} q_{k-1-i} \times p_i & (1 \leq k \leq N-2) \end{cases} \quad \text{Equation 1}$$

(where, $p_0, p_1, \ldots, p_{N-1}, q_0, q_1, \ldots, q_{N-2}$ belong to Galois field GF(2)) from coefficients $p_0$ to $p_{N-2}$ among inputted coefficients $p_{-1}$ to $p_{N-1}$ (wherein, N is a natural number of 2 or more); and a matrix calculation unit which outputs the output data calculated from the output data $b_0$ to $b_{N-1}$ represented by:

Equation 2
$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right)$$

and $$L = \begin{pmatrix} 1 & 0 & \ldots & 0 & 0 & 0 \\ q_0 & 1 & 0 & \ldots & 0 & 0 \\ q_1 & q_0 & 1 & 0 & \ldots & 0 \\ \vdots & & \ddots & \ddots & \ddots & \vdots \\ q_{N-3} & q_{N-4} & \ldots & q_0 & 1 & 0 \\ q_{N-2} & q_{N-3} & \ldots & q_1 & q_0 & 1 \end{pmatrix}$$

Equation 3

-continued $$U = \begin{pmatrix} p_{N-1} & p_{N-2} & \ldots & p_2 & p_1 & p_0 \\ 0 & p_{N-1} & p_{N-2} & \ldots & p_2 & p_1 \\ 0 & 0 & p_{N-1} & p_{N-2} & \ldots & p_2 \\ \vdots & & \ddots & \ddots & \ddots & \vdots \\ 0 & 0 & \ldots & 0 & p_{N-1} & p_{N-2} \\ 0 & 0 & \ldots & 0 & 0 & p_{N-1} \end{pmatrix}$$

from the q values $q_0$ to $q_{N-2}$, the coefficients $p_{-1}$ to $p_{N-1}$ and the input data $a_{-N}$ to $a_{-1}$, $a_0$ to $a_{N-1}$.

12 Claims, 15 Drawing Sheets

EXAMPLE OF N = 8 CIRCUITS

LINEAR FEEDBACK SHIFT CALCULATION APPARATUS, COMMUNICATION APPARATUS, MICROPROCESSOR, AND DATA OUTPUT METHOD IN A LINEAR FEEDBACK CALCULATION APPARATUS

CROSS-REFERENCE TO RELATED APPLICATIONS

This application is based upon and claims the benefit of priority of the prior Japanese Patent Application No. 2008-269523, filed on Oct. 20, 2008, the entire contents of which are incorporated herein by reference.

FIELD

The embodiments discussed herein are related to a linear feedback shift calculation apparatus, a communication apparatus, a microprocessor, and a data output method in a linear feedback shift calculation apparatus.

BACKGROUND

Communication apparatuses such as cell phones have conventionally been provided with a linear feedback shift calculation apparatus for processing various signals. For example, a linear feedback shift calculation apparatus is used as a scrambler for pseudo-randomizing transmission signals in order to compress transmission signal jitter and the like. Examples of this type of related art are described in Japanese Laid-open Patent Publication No. 2005-101753 and Japanese Laid-open Patent Publication No. H9-190339.

However, as depicted in FIG. 19B of Japanese Laid-open Patent Publication No. 2005-101753 and FIG. 3 of Japanese Laid-open Patent Publication No. H9-190339, a linear feedback shift calculation apparatus capable of parallel processing of multiple bits with a single clock has a feedback line connected to the next stage, and uses the results of the previous stage to carry out arithmetic processing. Consequently, delays accumulate and a considerable delay results for outputting all bits.

SUMMARY

According to an aspect of the invention, a linear feedback shift calculation apparatus, into which input data is input, and which outputs output data, including: an L generation unit which generates q values of $q_0$ to $q_{N-2}$ represented by:

$$q_k = \begin{cases} p_0 & (k = 0) \\ p_k + \sum_{i=0}^{k-1} q_{k-1-i} \times p_i & (1 \le k \le N-2) \end{cases} \quad \text{Equation 1}$$

(where, $p_0, p_1, \ldots, p_{N-1}, q_0, q_1, \ldots, q_{N-2}$ belong to Galois field GF(2)) from coefficients $p_0$ to $p_{N-2}$ among inputted coefficients $p_{-1}$ to $p_{N-1}$ (wherein, N is a natural number of 2 or more); and a matrix calculation unit which outputs the output data calculated from the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 2}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 3}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$, the coefficients $p_{-1}$ to $p_{N-1}$ and the input data $a_{-N}$ to $a_{-1}$, $a_0$ to $a_{N-1}$.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following provides an explanation of preferred embodiments of the present invention with reference to the drawings.

Figure 1:
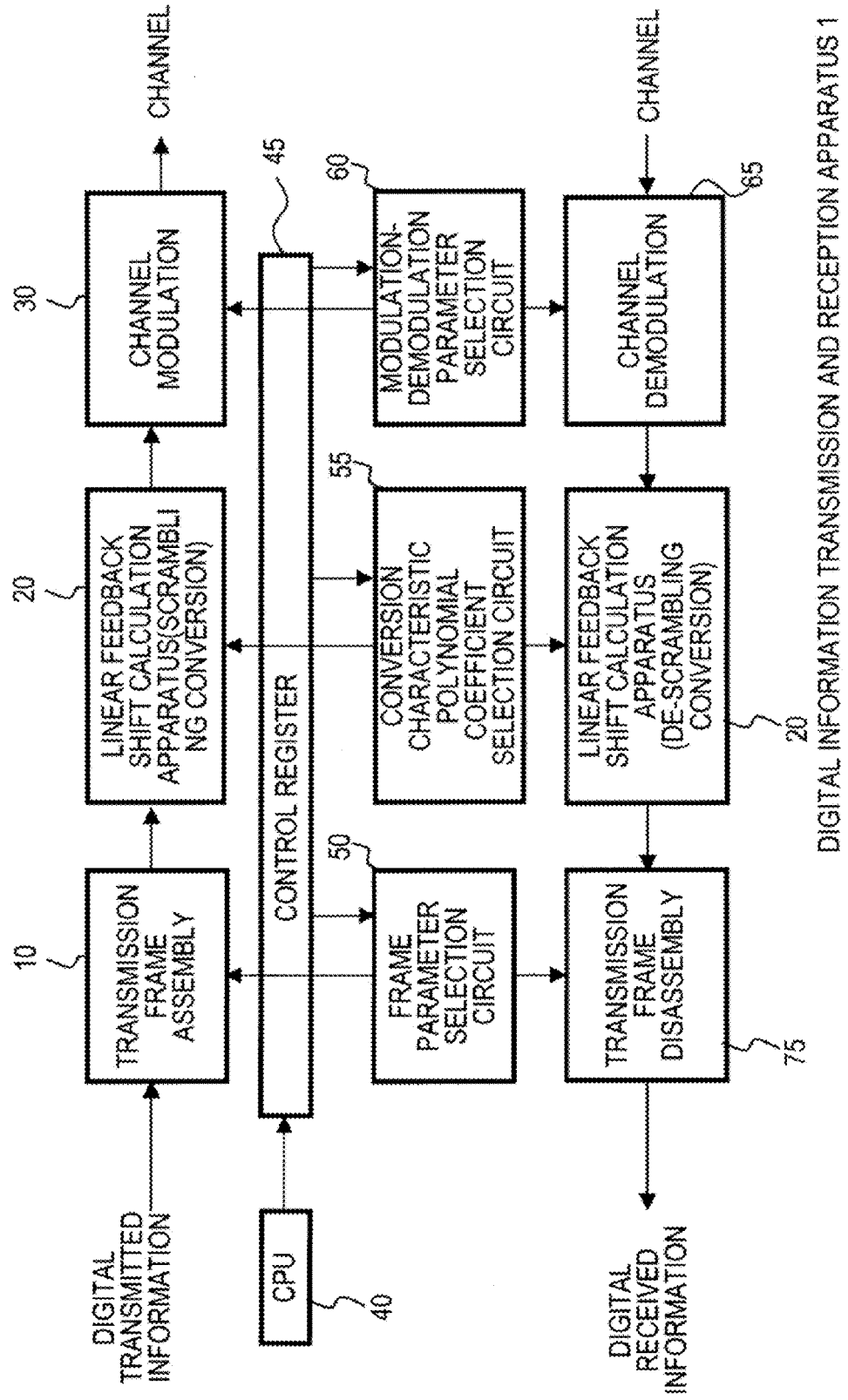
FIG. 1 is an example of the configuration of a digital information transmission and reception apparatus (communication apparatus)

FIG. 1 is an example of the configuration of a digital information transmission and reception apparatus (or communication apparatus) 1. The digital information transmission and reception apparatus 1 is provided with a transmission frame assembly unit 10, a linear feedback shift calculation apparatus 20, a channel modulation unit 30, a CPU 40, a control register 45, a frame parameter selection circuit 50, a conversion characteristic polynomial coefficient selection circuit 55, a modulation-demodulation parameter selection circuit 60, a channel demodulation unit 65, and a transmission frame disassembly unit 75.

The transmission frame assembly unit 10 converts digital transmission information to frames corresponding to the communication format (CDMA format, WiMAX format, IEEE802.11a/b or other wireless LAN format) based on frame parameters from the frame parameter selection circuit 50 and outputs those frames.

The linear feedback shift calculation apparatus 20 outputs encoded data obtained by scrambling and converting data contained in transmission frames based on a characteristic polynomial coefficient from the conversion characteristic polynomial coefficient selection circuit 55. The characteristic polynomial coefficient can also adopt various values corresponding to the communication format. The linear feedback shift calculation apparatus 20 is also a digital data conversion apparatus.

Furthermore, in addition to scrambling conversion, the linear feedback shift calculation apparatus 20 can also be embodied in the case of generating or testing data CRC codes or generating spread codes according to the CDMA format. In the present embodiment, the linear feedback shift calculation apparatus 20 is explained using the example of scrambling conversion.

The channel modulation unit 30 modulates each data of transmission frames following scrambling conversion based on the modulation parameters from the modulation-demodulation parameter selection circuit 60. The demodulation parameters can also adopt different values corresponding to the communication format. Modulated transmission frames are output to the channel.

The CPU 40 outputs control data indicating the communication format and the like.

The control register 45 retains control data from the CPU 40 and outputs the data to the frame parameter selection circuit 50, the conversion characteristic polynomial coefficient selection circuit 55 and the modulation-demodulation parameter selection circuit 60.

The frame parameter selection circuit 50 selects frame parameters corresponding to the communication format based on control data from the CPU 40, and outputs the frame parameters to the transmission frame assembly unit 10.

The conversion characteristic polynomial coefficient selection circuit 55 selects a characteristic polynomial coefficient corresponding to the communication format based on control data from the CPU 40, and outputs the coefficient to the linear feedback shift calculation apparatus 20.

The modulation-demodulation parameter selection circuit 60 selects modulation parameters and demodulation parameters corresponding to the communication format based on control data from the CPU 40, and outputs the parameters to the channel modulation unit 30 and the channel demodulation unit 65, respectively.

The frame parameter selection circuit 40, the conversion characteristic polynomial coefficient selection circuit 55 and the modulation-demodulation parameter selection circuit 60 may each be memories, and frame parameters, characteristic polynomial coefficients and modulation-demodulation parameters are stored therein.

The channel demodulation unit 65 demodulates data contained in transmission frames from the channel based on demodulation parameters.

The linear feedback shift calculation (descrambling conversion) apparatus 20 on the receiving side has the same configuration as the linear feedback shift calculation apparatus 20 on the sending side. Input data input to the receiving-side linear feedbacks shift calculation apparatus 20 is demodulated data, while output data is data output to the transmission frame disassembly unit 75. Data is deconverted to the original input data (digital transmission information) by carrying out scrambling conversion twice.

The transmission frame disassembly unit 75 extracts digital reception information from transmission frames containing descrambled converted data.

The digital transmission and reception apparatus 1 can carry out communication corresponding to multiple communication formats.

In addition, in the digital transmission and reception apparatus 1, the linear feedback shift calculation apparatus 20 may be made to calculate a portion of data contained in transmission frames output from the transmission frame assembly unit 10. For example, the linear feedback shift calculation unit 20 may be made to substitute a portion of the transmission frames with descrambled converted data.

Moreover, the linear feedback shift calculation apparatus 20 may be made to calculate a portion of data contained in transmission frames and insert the calculated data into transmission frames.

The receiving-side linear feedback shift calculation apparatus 20 may also be made to calculate a portion of the demodulated transmission frames and substitute a portion of those transmission frames with calculated data.

Figure 2:
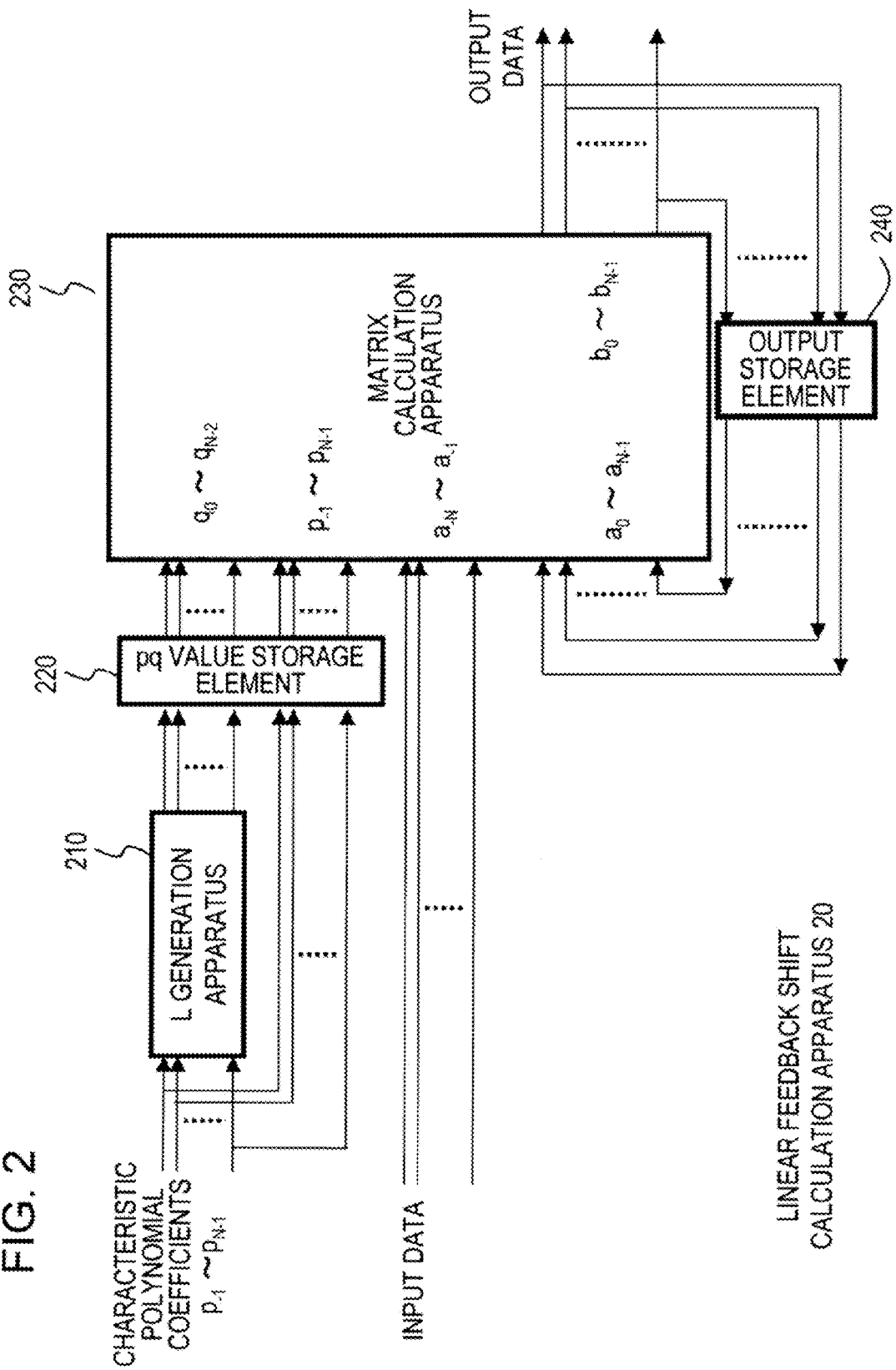
FIG. 2 is an example of the configuration of a linear feedback shift calculation apparatus.

FIG. 2 is an example of the configuration of the linear feedback shift calculation apparatus 20. The linear feedback shift calculation apparatus 20 is provided with an L generation apparatus 210, a pq value storage element 220, a matrix calculation apparatus 230, and an output storage element 240.

The L generation apparatus 210 is input with characteristic polynomial coefficients $p_{-1}$ to $p_{N-1}$ (where, N is a natural number of 2 or more) from the conversion characteristic polynomial coefficient selection circuit 55, and outputs q values $q_0$ to $q_{N-2}$ using characteristic polynomial coefficients $p_0$ to $p_{N-2}$. The L generation apparatus 210 brings together those specific portions of calculations executed by the linear feedback shift calculation apparatus 20 that can be calculated by characteristic polynomial coefficients only, the details of which are described later.

The pq value storage element 220 stores characteristic polynomial coefficients $p_{-1}$ to $p_{N-1}$ from the conversion characteristic polynomial coefficient selection circuit 55 and q values $q_0$ to $q_{N-2}$ from the L generation apparatus 210.

The matrix calculation apparatus 230 calculates output data $b_0$ to $b_{N-1}$ from input data $a_{-N}$ to $a_{-1}$, output values from the pq value storage element 220 (q values $q_0$ to $q_{N-2}$ and characteristic polynomial coefficients $p_{-1}$ to $p_{N-1}$), and output values $a_0$ to $a_{N-1}$ from the output storage element 240, and outputs these values as scrambling conversion values. In addition, the matrix calculation apparatus 230 stores output data $b_0$ to $b_{N-1}$ in the output storage element 240, reads out output data $b_0$ to $b_{N-1}$ stored in the output storage element 240 each time input data $a_0$ to $a_{N-1}$ is input to the matrix calculation apparatus 230, and uses that output data as input data $a_{-N}$ to $a_{-1}$. The details of the matrix calculation apparatus 230 are described later.

The output storage element 240 retains output data $b_0$ to $b_{N-1}$.

Figure 3:
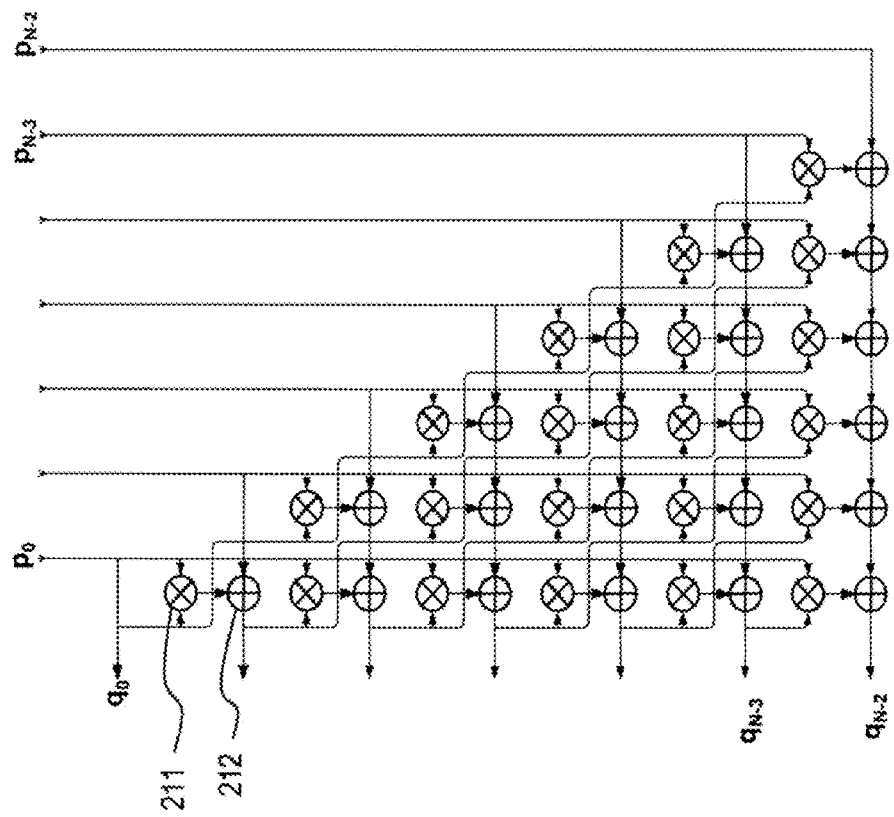
FIG. 3 is an example of the configuration of an L generation apparatus.

FIG. 3 is an example of the configuration of the L generation apparatus 210. The L generation apparatus 210 is provided with a plurality of multipliers 211 and adders 212. However, this multiplication and addition refers to multiplication and addition in respective Galois fields GF(2), and consists of arithmetic operations realized by logic AND arithmetic units and exclusive logic OR arithmetic units, respectively. In the L generation apparatus 210, for example, the first coefficient $p_0$ of the characteristic polynomial coefficients is output directly as $q_0$, the coefficient $p_0$ and the q value $q_0$ are multiplied by the multipliers 211, that value and the next coefficient p1 are added by the adders 212, and that value is output as the q value $q_1$ of the next bit. The L generation apparatus 210 employs a configuration in which these calculations are sequentially repeated. An output value $q_k$ (wherein, $0 \leq k \leq N-2$, and N is a natural number of 2 or more) of the L generation apparatus 210 can be represented by:

$$q_k = \begin{cases} p_0 & (k=0) \\ p_k + \sum_{i=0}^{k-1} q_{k-1-i} \times p_i & (1 \leq k \leq N-2) \end{cases} \quad \text{Equation 19}$$

(wherein, $p_0, p_1, \ldots, p_{N-1}, q_0, q_1, \ldots, q_{N-2}$ belong to Galois field GF(2)), and provided that N is a natural number of 2 or more. The L generation apparatus 210 has a circuit equivalent to Equation 19. A detailed description of q value and the like will be subsequently provided.

Figure 4:
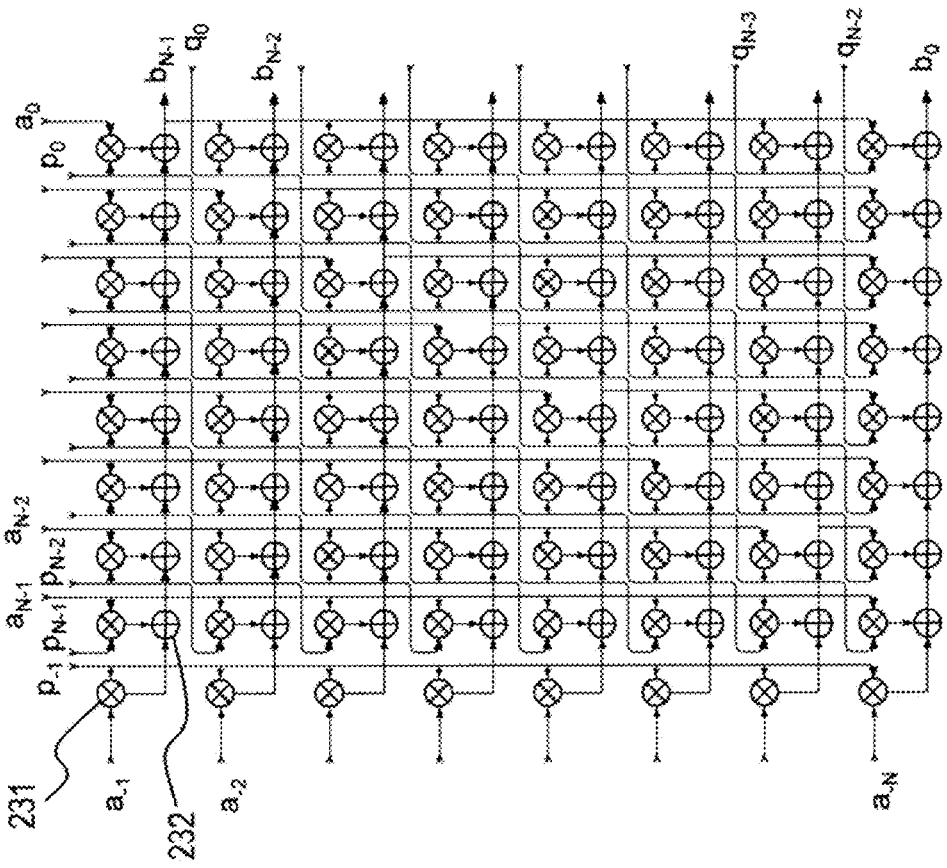
FIG. 4 is an example of the configuration of a matrix calculation apparatus.

FIG. 4 is an example of the configuration of the matrix calculation apparatus 230. The matrix calculation apparatus 230 carries out arithmetic processing on q values $q_0$ to $q_{N-2}$, characteristic polynomial coefficients $p_{-1}$ to $p_{N-1}$ and input data $a_{-N}$ to $a_{-1}$ and $a_0$ to $a_{N-1}$ from the L generation apparatus 210 with a plurality of multipliers 231 and adders 232, and outputs output data $b_0$ to $b_{N-1}$. However, this multiplication and addition refers to multiplication and addition in respective Galois fields GF(2), and consists of arithmetic operations realized by logic AND arithmetic units and exclusive logic OR arithmetic units, respectively. In the matrix calculation apparatus 230, for example, input data $a_{-1}$ and characteristic polynomial coefficient $p_{-1}$ are multiplied by the multipliers 231. Output value $a_{N-1}$ and characteristic polynomial coefficient $p_{N-1}$ from the output storage element 240 are multiplied by the multipliers. These two products are then added by the adders 232. The matrix calculation apparatus 230 repeats these calculations and outputs output data $b_0$ to $b_{N-1}$. Output values $b_0$ to $b_{N-1}$ of the matrix calculation apparatus 230 can be represented by:

$$\begin{pmatrix} b_{N-1} \\ b_{N-2} \\ \vdots \\ b_0 \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 20}$$

Here, L and U are Nth order square matrices, respectively, represented by:

$$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 21}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

The matrix calculation apparatus 230 depicted in FIG. 4 is a circuit equivalent to Equation 20.

Figure 5:
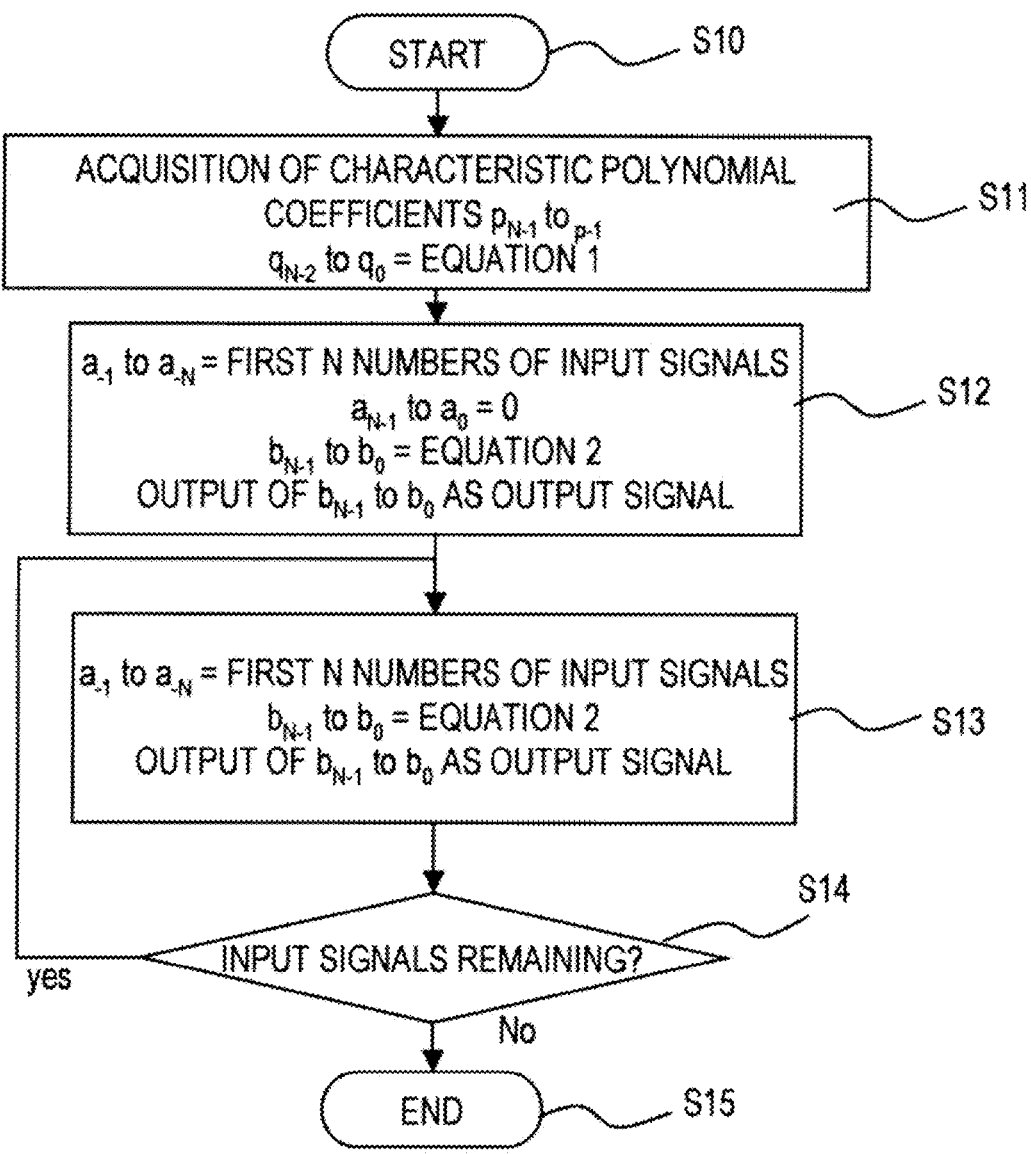
FIG. 5 is a flow chart depicting an example of processing by the linear feedback shift calculation apparatus.

FIG. 5 is a flow chart depicting an example of processing by the linear feedback shift calculation apparatus 20. Once processing starts (S10), the L generation apparatus 210 acquires characteristic polynomial coefficients $p_{-1}$ to $p_{N-1}$ from the conversion characteristic polynomial coefficient selection circuit 55 and outputs q values $q_0$ to $q_{N-2}$ (S11).

Next, the matrix calculation apparatus 230 calculates and outputs output data $b_0$ to $b_{N-1}$ (S12, S13). Namely, the matrix calculation apparatus 230 calculates output data $b_0$ to $b_{N-1}$ based on the first N number of input data $a_{-N}$ to $a_{-1}$ and output values $a_0$ to $a_{N-1}$ (initial value: 0) from the output storage element 240 and outputs that data (S12). Moreover, when input data $a_{-N}$ to $a_{-1}$ is input, the matrix calculation apparatus 230 calculates output data $b_0$ to $b_{N-1}$ obtained by the processing of S12 from output storage element 240 as input data $a_0$ to $a_{N-1}$ (S13).

Next, the matrix calculation apparatus 230 carries out processing of S13 if input data $a_{-N}$ to $a_{-1}$ has been input (Yes in S14), or ends processing (S15) if input data has not been input (No in S14). The matrix calculation apparatus 230 then outputs data obtained by scrambling and converting input data $a_{-N}$ to $a_{-1}$ as output data $b_0$ to $b_{N-1}$.

Figure 6:
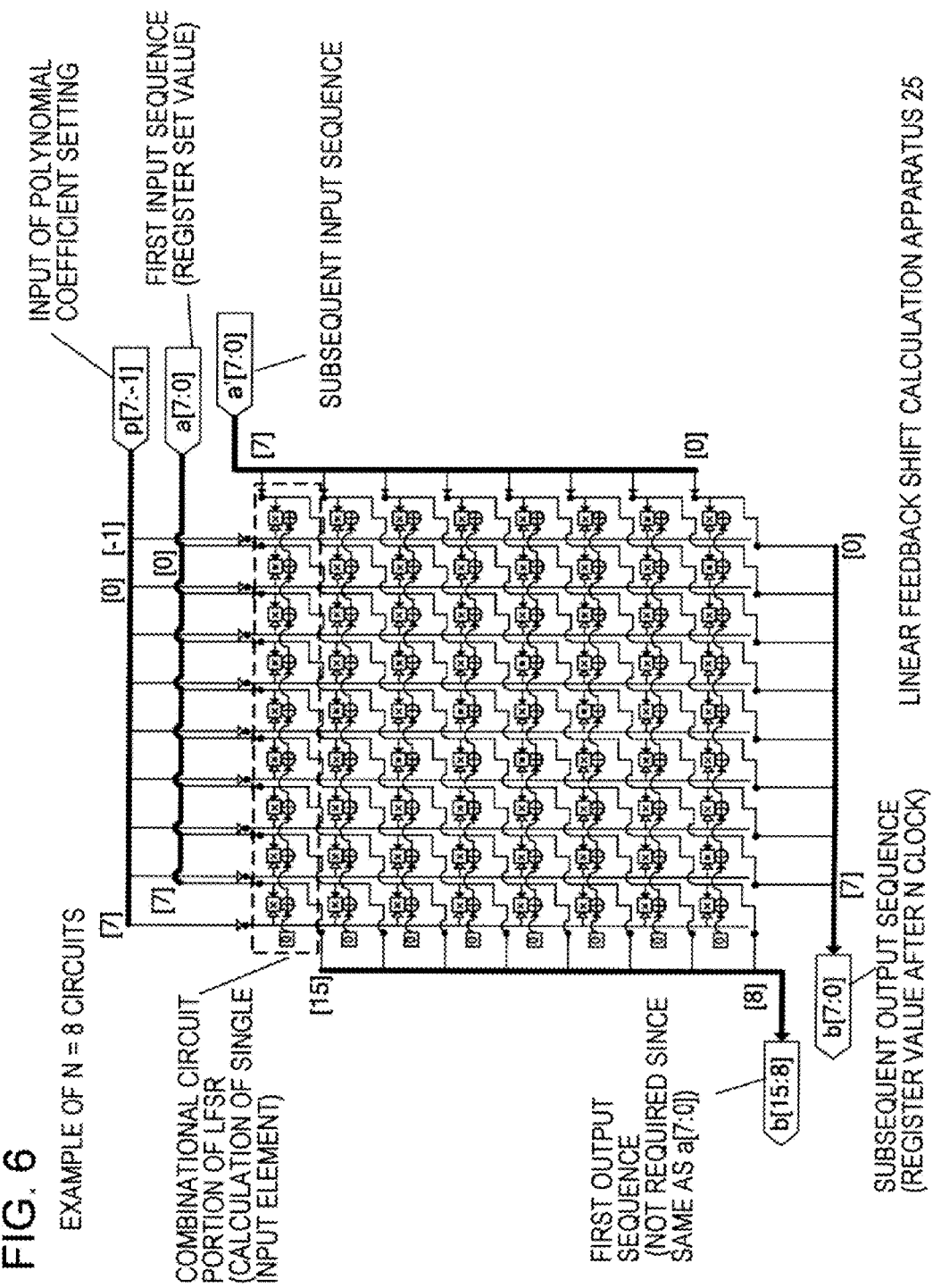
FIG. 6 is another example of the configuration of a linear feedback shift calculation apparatus.
Figure 7:
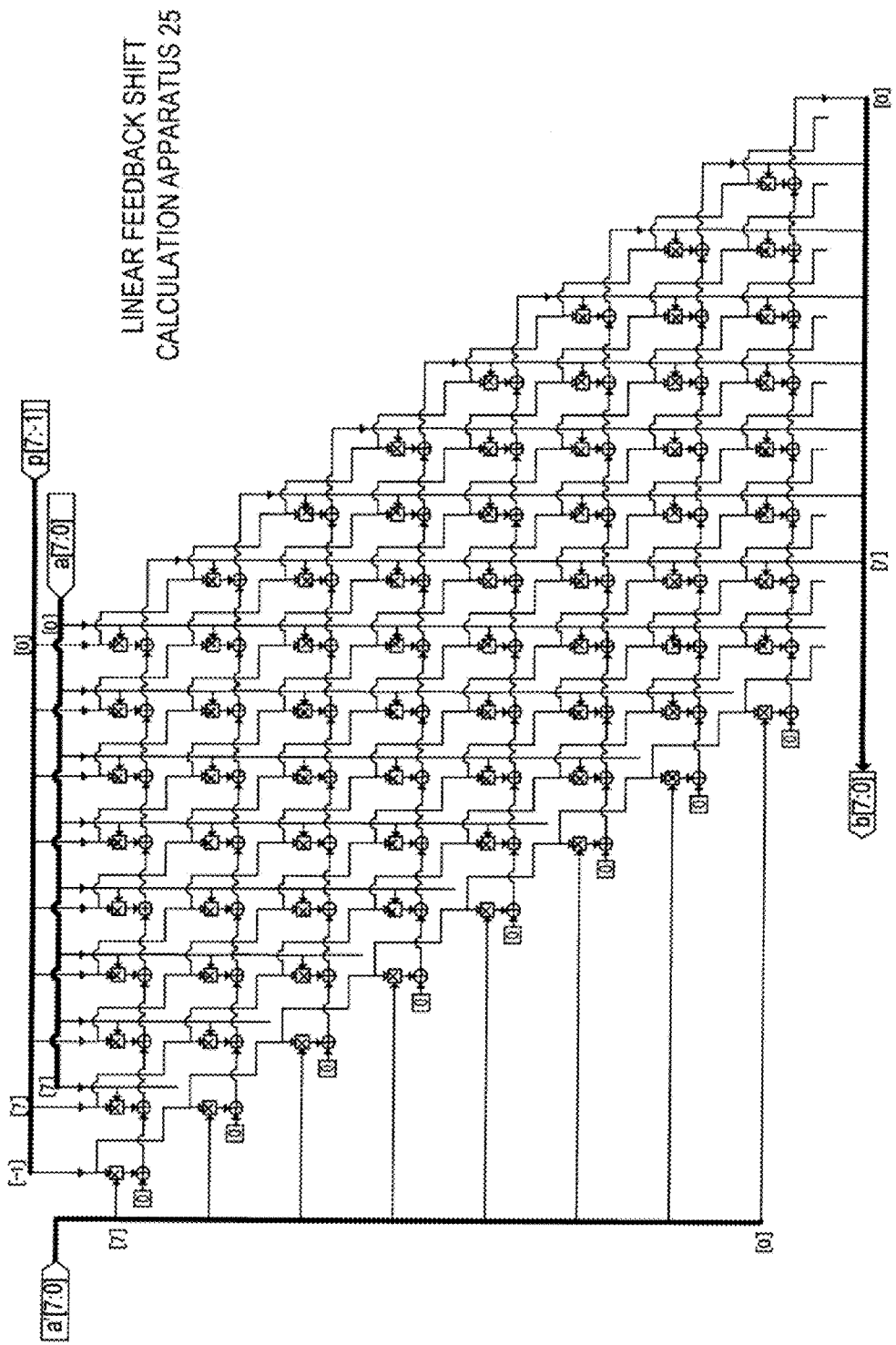
FIG. 7 is another example of the configuration of a linear feedback shift calculation apparatus.

Next, an explanation is provided of the configuration and equations of the L generation apparatus 210 and the matrix calculation apparatus 230. FIGS. 6 and 7 are an example of the configuration of a linear feedback shift calculation apparatus 25 of an 8-bit input (N=8). The linear feedback shift calculation apparatus 25 depicted in FIG. 6 is equivalent to the linear feedback shift calculation apparatus 20 depicted in FIG. 2. That in which the L generation apparatus 210 and the matrix calculation apparatus 230 and the like have been removed from the linear feedback shift calculation apparatus 25 is the linear feedback shift calculation apparatus 20 depicted in FIG. 2. Furthermore, the linear feedback shift calculation apparatus 25 depicted in FIG. 7 is an example of a configuration in which the linear feedback shift calculation apparatus 25 depicted in FIG. 6 has been slid over by one stage each.

The linear feedback shift calculation apparatus 25 is able to make the current tap position active as a result being imparted with linear polynomial coefficients $p_{-1}$ to $p_{N-1}$ of arbitrary values. The linear feedback shift calculation apparatus 25 is able to calculate the output of multiple bits (N=8 in the example of FIG. 6) in parallel with a single clock as a result of the combinational circuit portions of each stage being connected in the form of a cascade connection. When input data $a_0$ to $a_{N-1}$ is imparted to this linear feedback shift calculation apparatus 25, pseudo-randomized output data $b_0$ to $b_{N-1}$ is output for input data $a_0$ to $a_{N-1}$ in the same manner as the linear feedback shift calculation apparatus 25 depicted in FIG. 2.

Output data $b_0$ to $b_{N-1}$ of this linear feedback shift calculation apparatus 20 can be represented as follows:

$$b_{N-1-k} = \begin{cases} \sum_{i=0}^{N-1} p_i \times a_i + p_{-1} \times a_{-1} & (k=0) \\ \sum_{i=0}^{N-1} p_i \times a_{i+k} + \sum_{i=0}^{k-1} p_i \times b_{N-k+i} + & (1 \leq k \leq N-2) \\ p_{-1} \times a_{-1-k} & \end{cases} \quad \text{Equation 22}$$

(wherein, $a_{N-1}, a_{N-2}, \ldots, a_0, a_{-1}, a_{-2}, \ldots, a_{-N}, p_{N-1}, p_{N-2}, \ldots, p_0, p_{-1}$ belong to Galois field GF(2)). The linear feedback shift calculation apparatus 25 is a circuit equivalent to this Equation 22.

Figure 8:
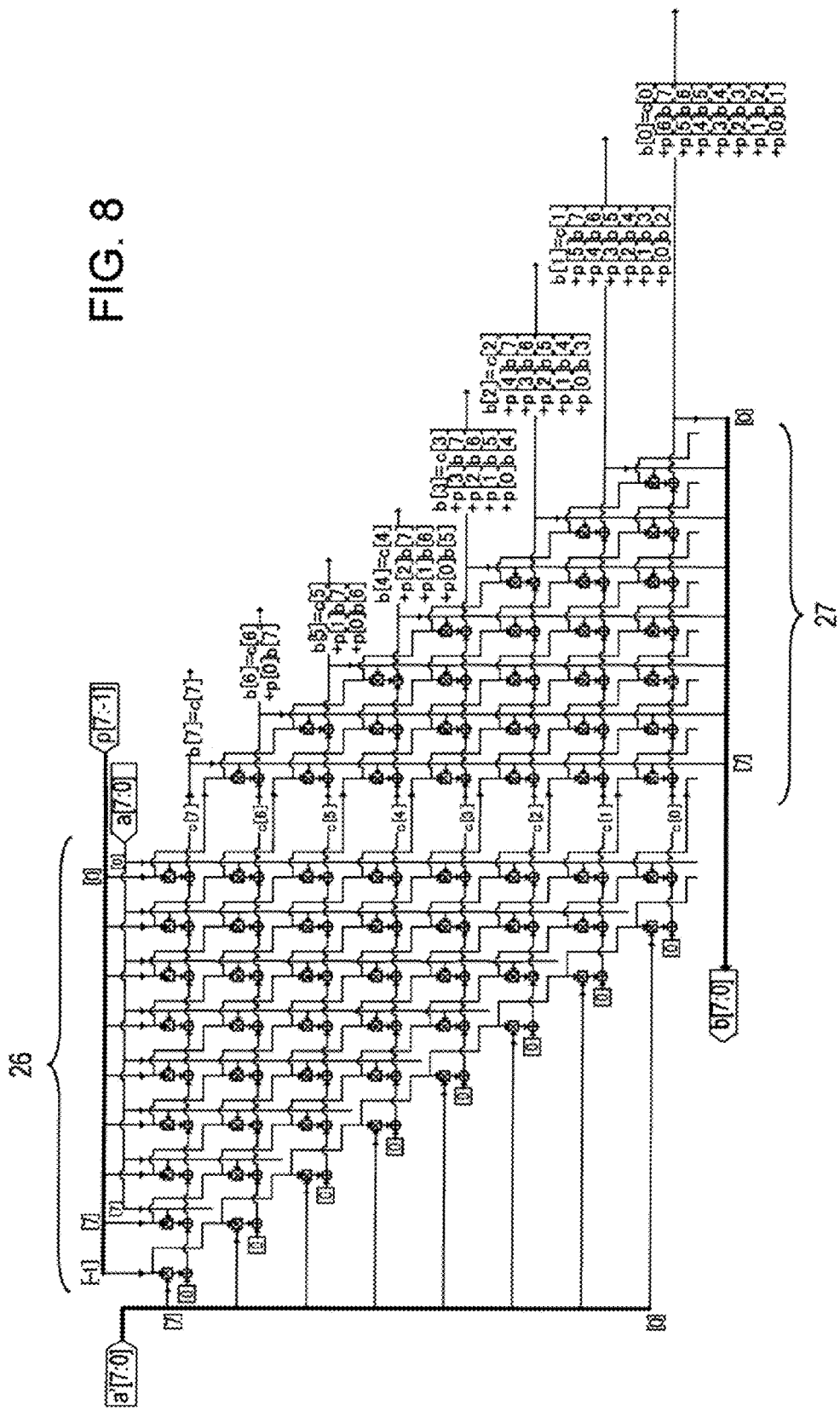
FIG. 8 is another example of the configuration of a linear feedback shift calculation apparatus.

Here, the linear feedback shift calculation apparatus 25 can be divided into two circuit portions. FIG. 8 is an example of a configuration in which the linear feedback shift calculation apparatus 25 depicted in FIG. 6 and the like is divided into two circuit portions.

As depicted in the drawing, the linear feedback shift calculation apparatus 25 can be divided into a first circuit 26 and a second circuit 27. The first circuit 26 is a circuit portion capable of carrying out calculations directly using input values. The second circuit 27 is a circuit portion has a feedback line connected thereof and carries out calculations using output from the previous stage.

Here, intermediate variables c[0] to c[7] are introduced. The intermediate variables c[0] to c[7] are values obtained when input values have been determined. Output values b[0] to b[7] can be represented using these intermediate variables c[0] to c[7] in the following manner:

$$\begin{pmatrix} b[7] \\ b[6] \\ b[5] \\ b[4] \\ b[3] \\ b[2] \\ b[1] \\ b[0] \\ c[7] \\ c[6] \\ c[5] \\ c[4] \\ c[3] \\ c[2] \\ c[1] \\ c[0] \end{pmatrix} = \begin{pmatrix} 0 & 0 & 0 & 0 & 0 & 0 & 0 & 0 & 1 & 0 & 0 & 0 & 0 & 0 & 0 & 0 \\ p[0] & 0 & 0 & 0 & 0 & 0 & 0 & 0 & 0 & 1 & 0 & 0 & 0 & 0 & 0 & 0 \\ p[1] & p[0] & 0 & 0 & 0 & 0 & 0 & 0 & 0 & 0 & 1 & 0 & 0 & 0 & 0 & 0 \\ p[2] & p[1] & p[0] & 0 & 0 & 0 & 0 & 0 & 0 & 0 & 0 & 1 & 0 & 0 & 0 & 0 \\ p[3] & p[2] & p[1] & p[0] & 0 & 0 & 0 & 0 & 0 & 0 & 0 & 0 & 1 & 0 & 0 & 0 \\ p[4] & p[3] & p[2] & p[1] & p[0] & 0 & 0 & 0 & 0 & 0 & 0 & 0 & 0 & 1 & 0 & 0 \\ p[5] & p[4] & p[3] & p[2] & p[1] & p[0] & 0 & 0 & 0 & 0 & 0 & 0 & 0 & 0 & 1 & 0 \\ p[6] & p[5] & p[4] & p[3] & p[2] & p[1] & p[0] & 0 & 0 & 0 & 0 & 0 & 0 & 0 & 0 & 1 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 1 \end{pmatrix} \cdot \begin{pmatrix} b[7] \\ b[6] \\ b[5] \\ b[4] \\ b[3] \\ b[2] \\ b[1] \\ b[0] \\ c[7] \\ c[6] \\ c[5] \\ c[4] \\ c[3] \\ c[2] \\ c[1] \\ c[0] \end{pmatrix} \quad \text{Equation 23}$$

For example, $b[5]=p[1]b[7]+p[0]b[6]+c[5]$. This Equation 23 represents a recursion formula relating to output values b[0] to b[7] in the form of a matrix. This matrix can be represented as follows:

$$\begin{bmatrix} b \\ c \end{bmatrix} = \begin{bmatrix} T_P & I_N \\ O_N & I_N \end{bmatrix} \cdot \begin{bmatrix} b \\ c \end{bmatrix} \quad \text{Equation 24}$$

wherein, $O_N$ is a Nth order zero matrix, $I_N$ is an Nth order unit matrix, and $T_p$ is an Nth order square matrix in which all diagonal components are "0".

In Equation 23, b[7] is first determined by the initial substitution, and b[6] is determined in the next substitution. Namely, in the determinant of Equation 23, b[ ] appearing on the right side of Equation 23 can be eliminated by repeating substitution eight times. Thus, each output value b[0] to b[N−1] represented by intermediate variable c[ ] can be obtained by determining the Nth power of the matrix of Equation 24.

The Nth power of Equation 24 becomes as follows.

$$\begin{bmatrix} T_P & I_N \\ O_N & I_N \end{bmatrix}^N = \begin{bmatrix} T_P^N(=O_N) & \sum_{k=0}^{N-1} T_P^k \\ O_N & I_N \end{bmatrix} \quad \text{Equation 25}$$

Here, since $T_p$ is an Nth order square lower triangular matrix in which all diagonal components are "0", Tp becomes as depicted below.

$$T_P^N = O_N \quad \text{Equation 26}$$

Thus, once the following is determined, $$L_P = \sum_{k=0}^{N-1} T_P^k = T_P^{N-1} + T_P^{N-2} + \ldots + T_P + I_N \quad \text{Equation 27}$$

output values b[ ] can be determined from intermediate variables c[ ].

Here, when $(I_N - T_P)$ is multiplied from the left to both sides of Equation 27, left side $=(I_N - T_P)L_P$, and right side $=I_N - T_P^N = I_N$ Here, deformation on the right side is dependent on Equation 26. The following results since both sides are equal.

$$L_P = (I_N - T_P)^{-1} \quad \text{Equation 28}$$

Namely, $L_P$ is the inverse matrix of $(I_N - T_P)$. The matrix $(I_N - T_P)$ is as depicted below.

$$\begin{pmatrix} 1 & 0 & \cdots & \cdots & \cdots & \cdots & 0 \\ -p[0] & 1 & 0 & \cdots & \cdots & \cdots & 0 \\ -p[1] & -p[0] & 1 & \cdots & \cdots & \cdots & 0 \\ \vdots & & \ddots & \ddots & & & \vdots \\ -p[N-3] & -p[N-4] & \cdots & -p[1] & -p[0] & 1 & 0 \\ -p[N-2] & -p[N-3] & -p[N-4] & \cdots & -p[1] & -p[0] & 1 \end{pmatrix}$$

Equation 29

Here, $L_P$ is assumed to be a lower triangular Toeplitz matrix in which all diagonal components are "1". A Toeplitz matrix is the generic term for a matrix in which the same elements are arranged diagonally. This assumption is based on the fact that $(I_N-T_P)$ indicated in Equation 29 is a lower triangular Toeplitz matrix in which all diagonal components are "1", and that in general, a lower triangular Toeplitz matrix in which all diagonal components are "1" has the property of having an inverse matrix in the form a lower triangular Toeplitz matrix in which all diagonal components are "1". On the basis of this assumption, matrix $L_P$ is represented as depicted below.

$$L_P = \begin{pmatrix} 1 & 0 & \cdots & \cdots & \cdots & \cdots & 0 \\ q[0] & 1 & 0 & \cdots & \cdots & \cdots & 0 \\ q[1] & q[0] & 1 & \cdots & \cdots & \cdots & 0 \\ \vdots & & \ddots & \ddots & & & \vdots \\ q[N-3] & q[N-4] & \cdots & q[1] & q[0] & 1 & 0 \\ q[N-2] & q[N-3] & q[N-4] & \cdots & q[1] & q[0] & 1 \end{pmatrix}$$

Equation 30

Since $L_P(I_N-T_P)=I_N$ from Equation 28, each component q[ ] of matrix $L_P$ is required to satisfy the following equation by comparing the first column of $L_P(I_N-T_P)$ with the first column of $I_N$.

$$\begin{pmatrix} q[0] \\ q[1] \\ q[2] \\ \vdots \\ q[N-2] \end{pmatrix} = \begin{pmatrix} (1)(p[0]) \\ (q[0])(p[0])+(1)(p[1]) \\ (q[1])(p[0])+(q[0])(p[1])+(1)(p[2]) \\ \vdots \\ (q[N-3])(p[0])+(q[N-4])(p[1])+\ldots+ \\ (q[0])(p[N-3])+(1)(p[N-2]) \end{pmatrix}$$

Equation 31

Conversely, since $L_P$ defined as in Equation 30 results according to q[ ] that satisfies Equation 31, and $I_N$ results when the product of the matrix represented by Equation 29 is calculated, $L_P(I_N-T_P)=I_N$, or in other words, Equation 28 is valid without contradiction. $L_P$ was determined this manner.

On the other hand, b[ ]=$L_P$c[ ] from Equations 27 and 25. Thus, once matrix $L_P$ has been determined, b[ ] can be determined by calculating the matrix from the value of c[ ].

Equation 19 is a representation of each component of Equation 31 in the form of an equation, and the L generation apparatus 210 is a representation of Equation 31 in the form of a circuit. As was previously described, these Equations 31 and 30 are determined by deformation of the second circuit 27 of the linear feedback shift calculation apparatus 25 so as to be able to be represented with the variable c[ ]. Thus, the second circuit 27 of a circuit configuration in which a feedback line is connected to the next stage can be substituted with the product of the matrix $L_P$ determined according to the value (q[ ]) output by the L generation apparatus 210 and a vector composed of the variable c[ ].

On the other hand, in FIG. 8 a matrix calculation formula for obtaining an intermediate variable c[ ] (equivalent to the first circuit 26) can be represented in the following manner.

$$\begin{pmatrix} c[N-1] \\ c[N-2] \\ \vdots \\ c[1] \\ c[0] \end{pmatrix} = U_P \begin{pmatrix} a[N-1] \\ a[N-2] \\ \cdots \\ a[1] \\ a[0] \end{pmatrix} + p[-1] \begin{pmatrix} a'[N-1] \\ a'[N-2] \\ \vdots \\ a'[1] \\ a'[0] \end{pmatrix}$$

Equation 32

Here, matrix $U_P$ is as indicated below.

$$U_P = \begin{pmatrix} p[N-1] & p[N-2] & \cdots & p[1] & p[0] \\ 0 & p[N-1] & p[N-2] & & p[1] \\ \vdots & & \ddots & \ddots & \vdots \\ 0 & & & p[N-1] & p[N-2] \\ 0 & 0 & \cdots & 0 & p[N-1] \end{pmatrix}$$

Equation 33

In summary of the above, the output value b of the linear feedback shift calculation apparatus 25 can be represented as depicted below using $U_P$, $L_P$, p[−1], a[ ] and a'[ ].

$$b = L_P\{U_P a + p[-1]a'\}$$

Equation 34

This Equation 34 is equivalent to the previously described Equation 20.

In this manner, the linear feedback shift calculation apparatus 20 depicted in FIG. 2 separates the circuit portion for feeding back by a feedback line from the linear feedback shift calculation apparatus 25 depicted in FIG. 6 (the second circuit 27) and the circuit portion for determining the product of the L generation apparatus 210 for calculating the matrix $L_p$ and vector composed of matrix $L_p$ and variable c[ ].

Next, an explanation is provided of simulation results of the linear feedback shift calculation apparatus 20 configured in this manner. FIGS. 9 to 12 are examples of simulation results.

Figure 9:
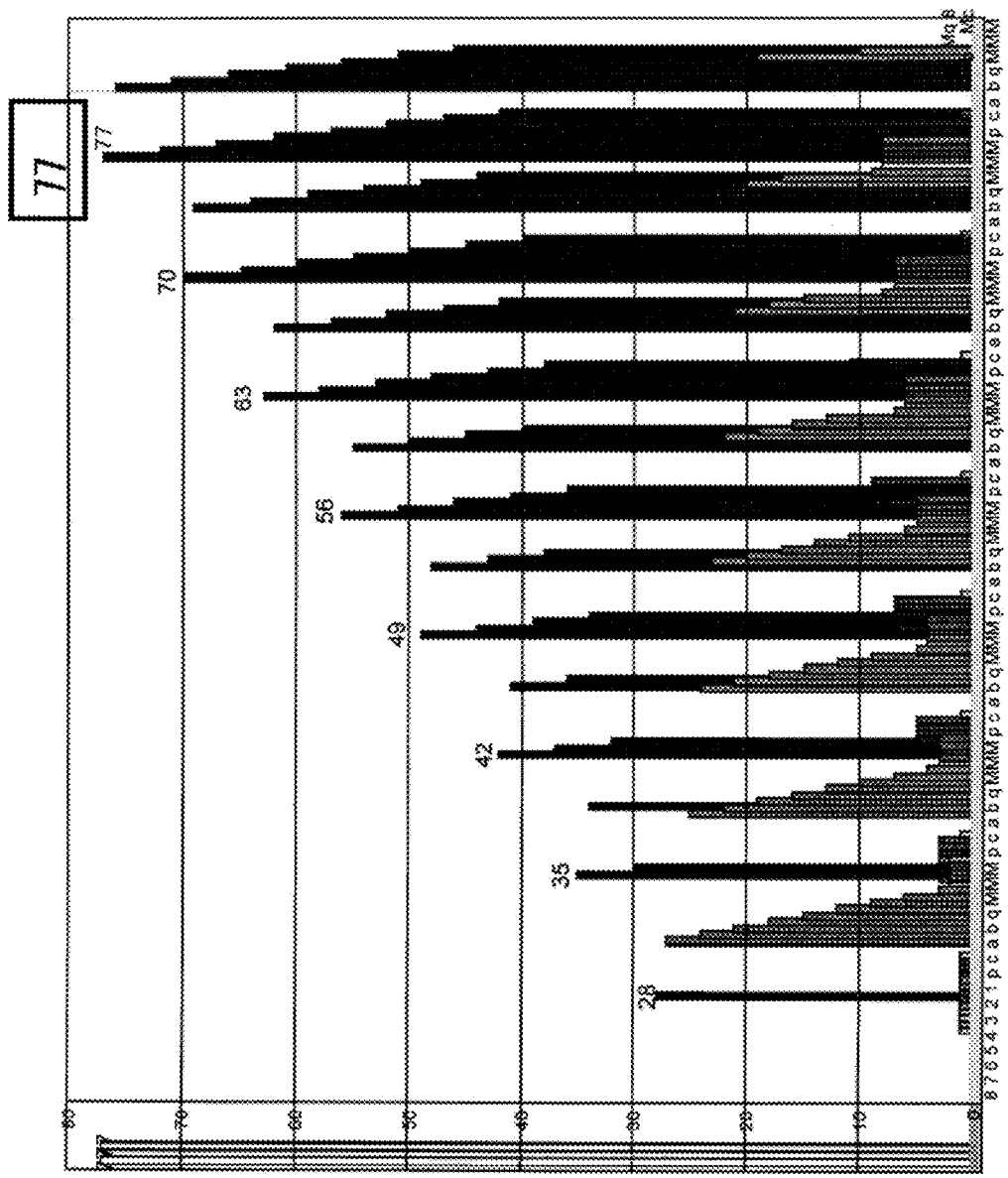
FIG. 9 is an example of simulation results.

Among these drawings, FIG. 9 is an example of simulation results in the case of polynomial coefficient p changing each time input data a is input in the case of using the linear feedback shift calculation apparatus 25 (FIG. 6). Time is depicted in the vertical axis, while each stage of the linear feedback shift calculation apparatus 25 is depicted on the horizontal axis. As depicted in FIG. 9, when the time at which calculation begins in the linear feedback shift calculation apparatus 25 is defined as "0", results are obtained in which a time "77" is required until output is obtained from the final stage.

Figure 10:
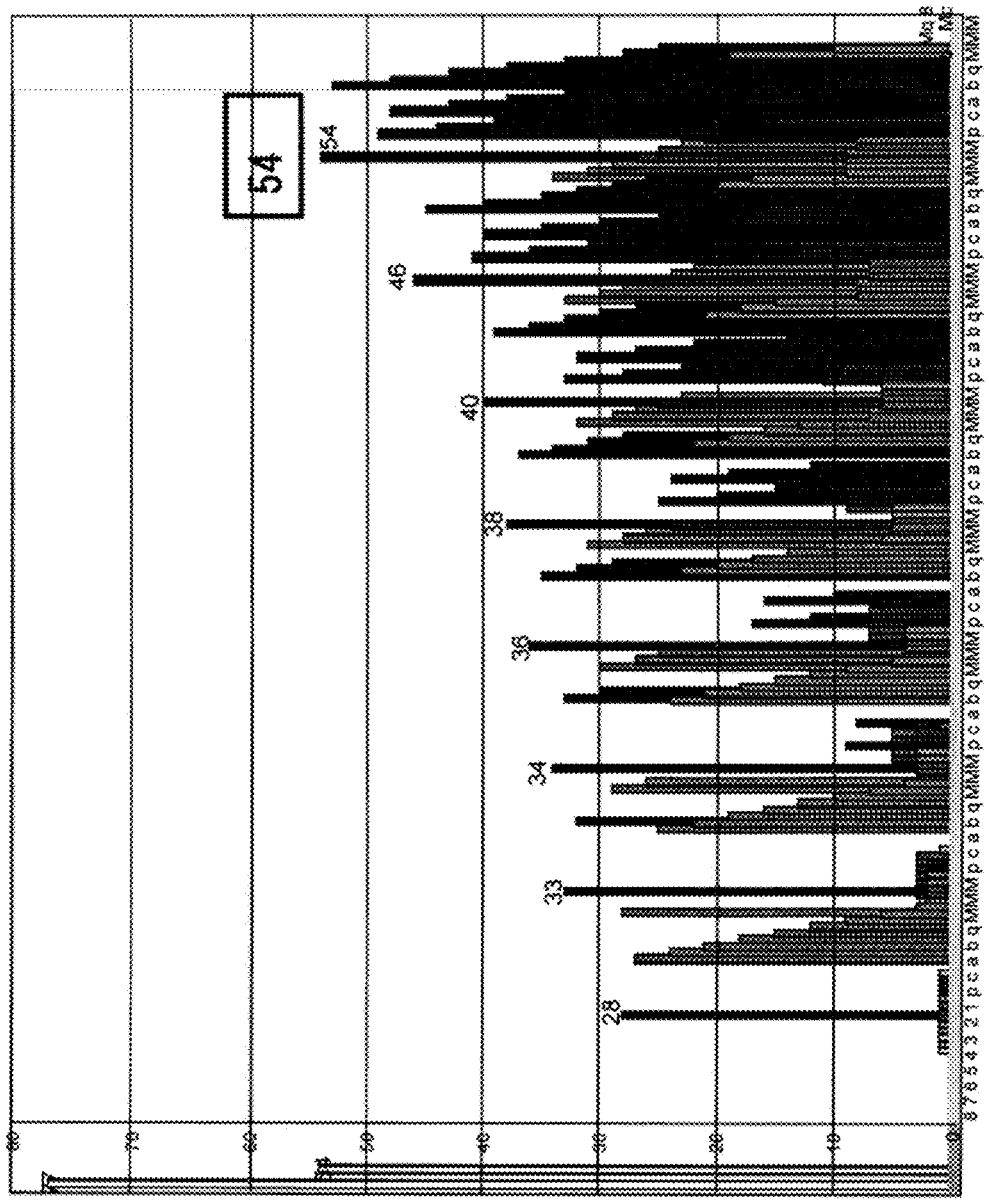
FIG. 10 is an example of simulation results.

FIG. 10 is an example of simulation results in the case polynomial coefficient p changes each time input data a is input in the case of using the linear feedback shift calculation apparatus 20 (FIG. 2). As depicted in this drawing, a time of "54" is required until the output from the final stage is obtained, and the delay time is shorter in comparison with the linear feedback shift calculation apparatus 25 in which feedback lines are connected in the manner of a cascade.

Figure 11:
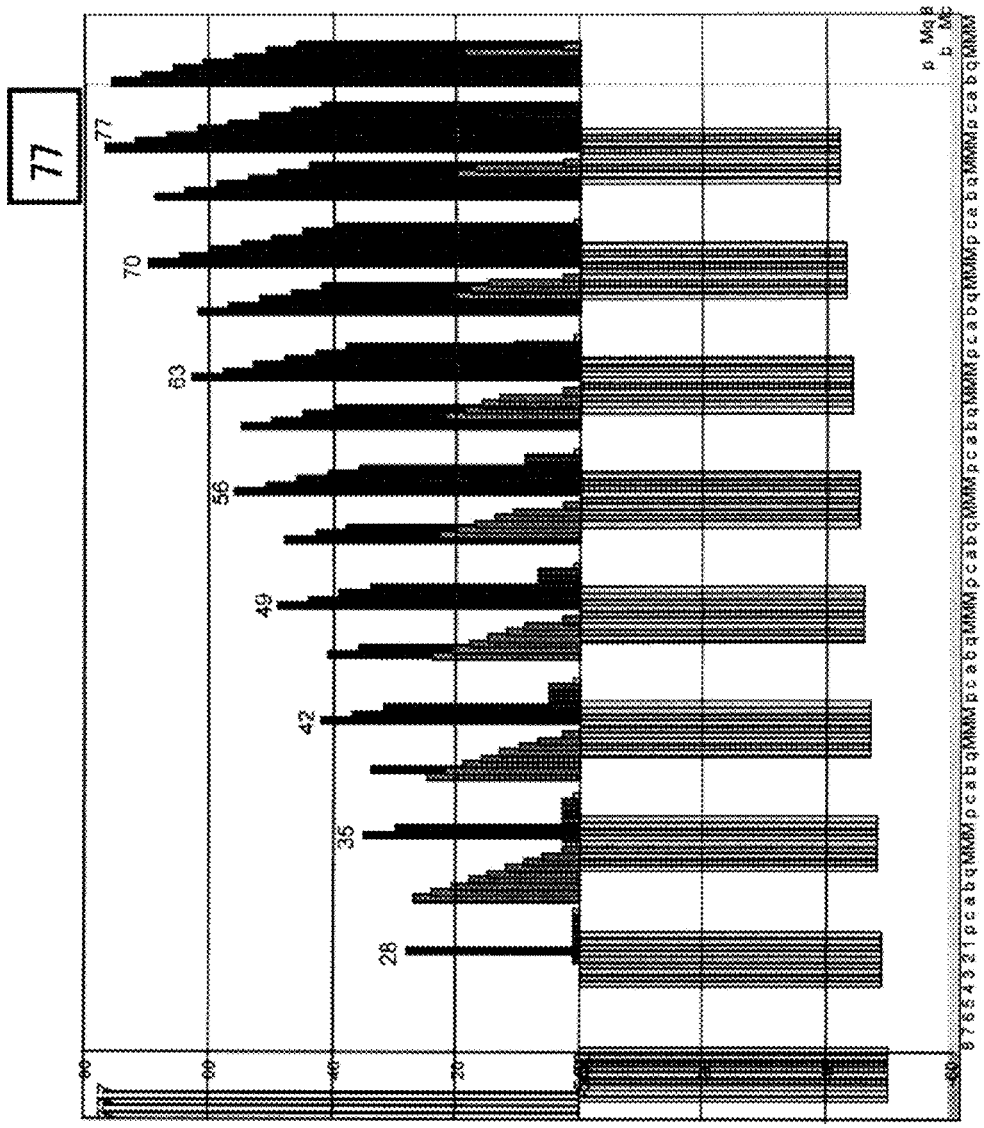
FIG. 11 is an example of simulation results.

FIG. 11 is an example of simulation results in the case of using the linear feedback shift calculation apparatus 25 and predetermining polynomial coefficient p prior to calculation. In this case as well, results were obtained in which a time "77" is required from the start of calculations by the linear feedback shift calculation apparatus 25 until output is obtained. Regardless of whether or not the polynomial coefficient p changes for each input of input data a, there is no change in the delay time of the linear feedback shift calculation apparatus 25 in which feedback lines are connected in the manner of a cascade.

Figure 12:
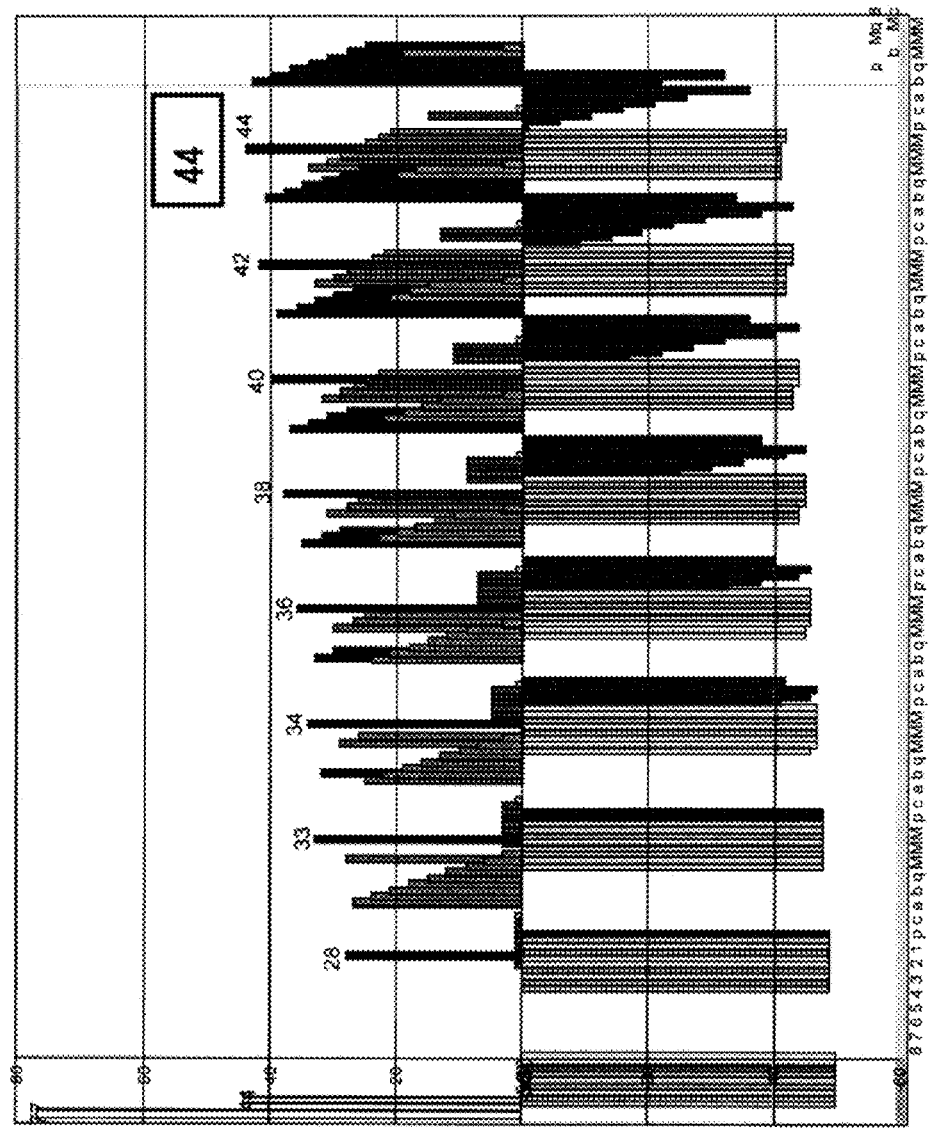
FIG. 12 is an example of simulation results.

FIG. 12 is an example of simulation results in the case of using the linear feedback shift calculation apparatus 20 and predetermining polynomial coefficient p prior to calculation. In this case, results were obtained in which a time "44" is required from the start of calculations by the linear feedback shift calculation apparatus 20 until output is obtained. In this application, there are many cases in which the frequency at which characteristic polynomial coefficient p changes is lower than the frequency of calculation, and thus there are many cases in which the time during which the characteristic polynomial coefficient p is determined prior to calculation is long. In such cases, although delay is improved in the case of using the linear feedback shift calculation apparatus 25, in the case of using the linear feedback shift calculation apparatus 20 (FIG. 2), delay time is improved as a result of eliminating the effect of the processing delay of the L generation apparatus 210.

On the basis of the simulation results described above, the linear feedback shift calculation apparatus 20 provided with the L generation apparatus 210 and the matrix calculation apparatus 230 has a shorter delay time than the linear feedback shift calculation apparatus 25 in which feedback lines are connected in the form of a cascade, and that delay time becomes even shorter in the case polynomial coefficient p is predetermined prior to calculation (FIG. 12).

Figure 13:
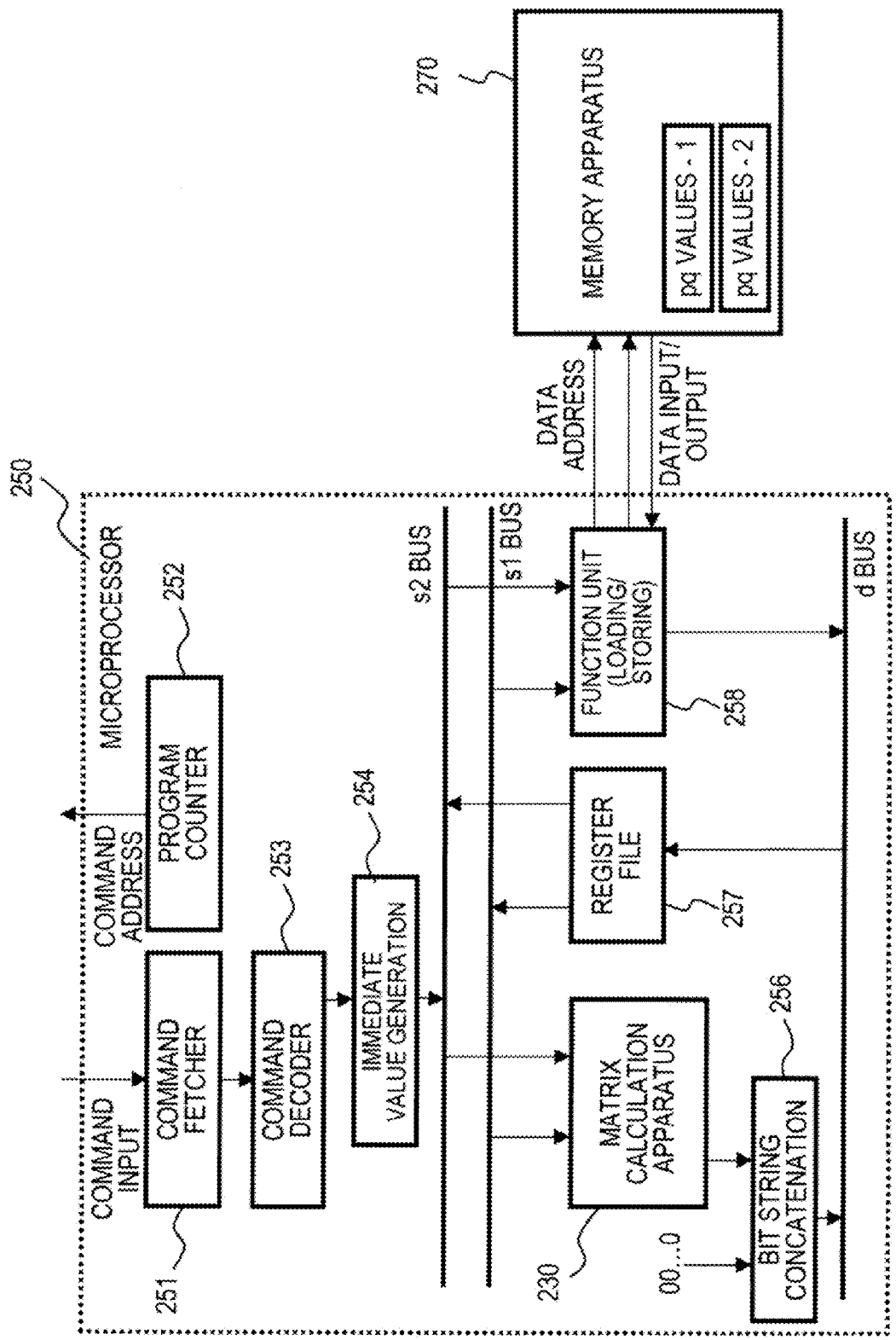
FIG. 13 is another example of the configuration of a linear feedback shift calculation apparatus.
Figure 14:
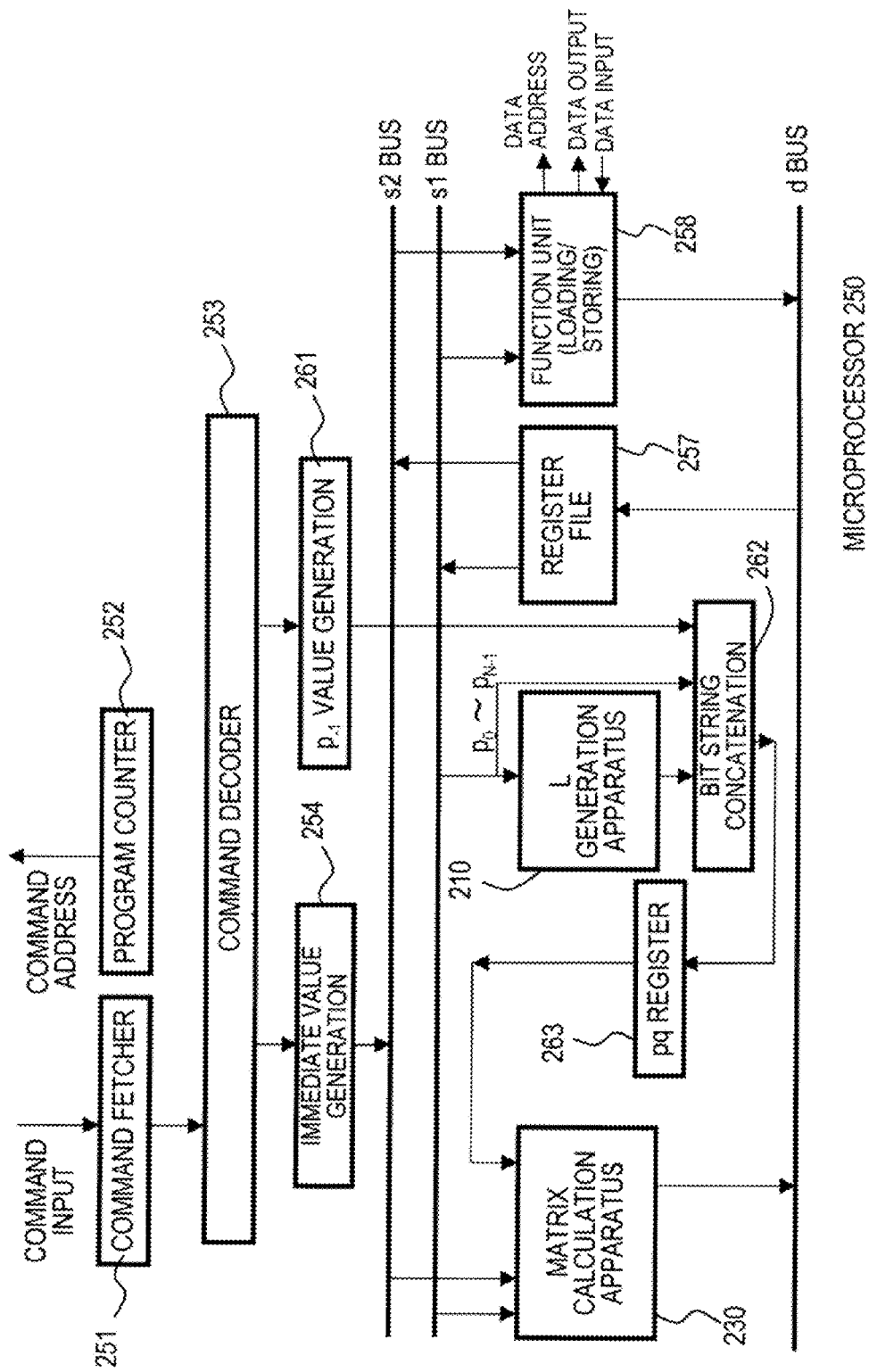
FIG. 14 is another example of the configuration of a linear feedback shift calculation apparatus.
Figure 15:
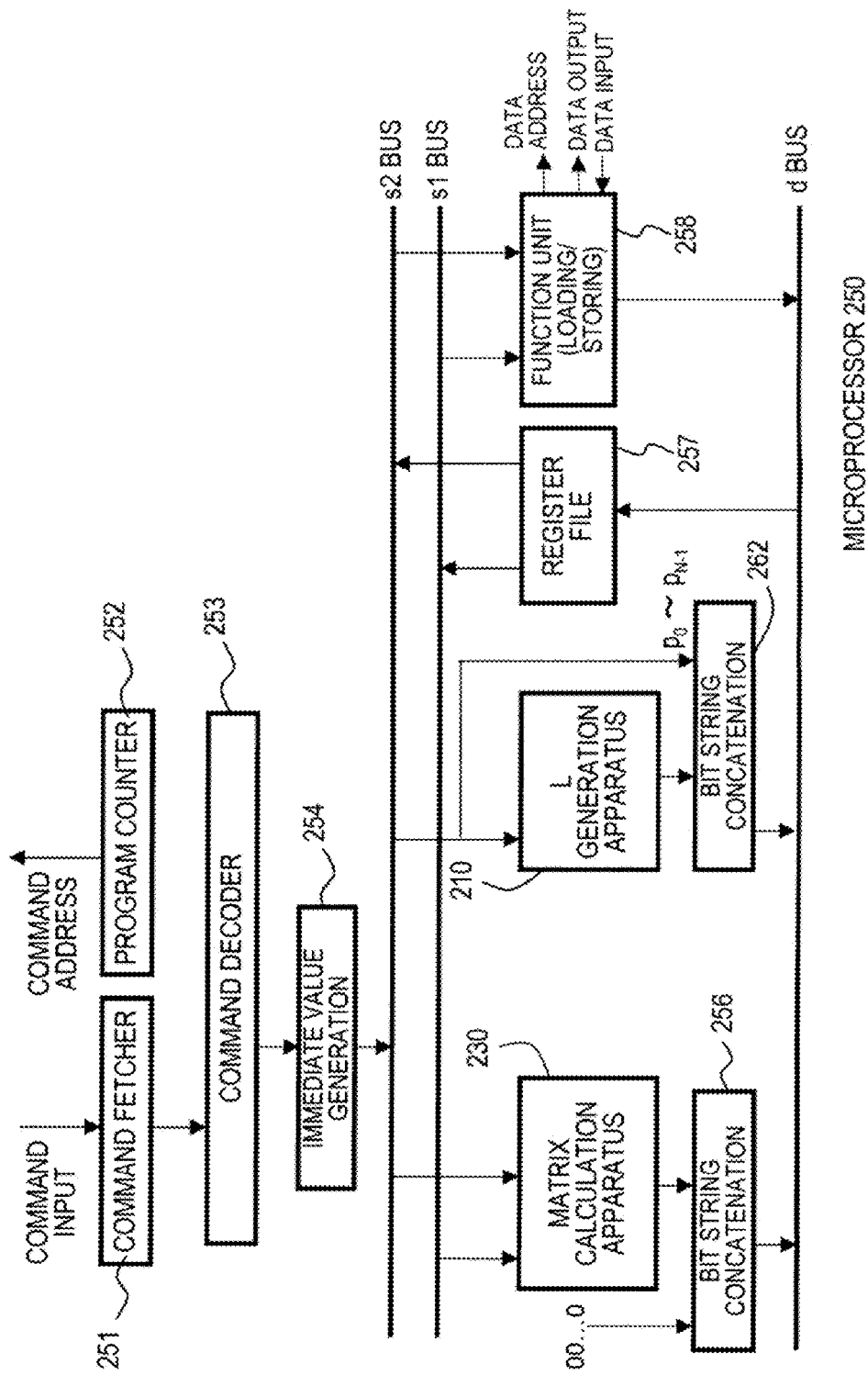
FIG. 15 is another example of the configuration of a linear feedback shift calculation apparatus.

Next, an explanation is provided of another example of the configuration of the linear feedback shift calculation apparatus 20. FIGS. 13 to 15 are the configuration examples, and depict examples in which the linear feedback shift calculation apparatus 20 is configured with a microprocessor. The linear feedback shift calculation apparatus 20 enables the use of dedicated commands to the use of a microprocessor.

As depicted in FIG. 13, a microprocessor 250 is provided with the matrix calculation apparatus 230, a command fetcher 251, a program counter 252, a command decoder 253, an immediate value generation unit 254, a bit string concatenation unit 256, a register file 257 and a function unit 258. Among these, the immediate value generation unit 254, the matrix calculation apparatus 230, the register file 257 and the function unit 258 are mutually connected to an s1 bus and s2 bus. In addition, the bit string concatenation unit 256, the register file 257 and the function unit 258 are mutually connected to a d bus.

The microprocessor 250 is connected to a memory apparatus 270. The memory apparatus 270 stores the results (q values) of calculations carried out by the L generation apparatus 210 (Equation 19) and characteristic polynomial coefficient p values. The q values are determined in advance by calculation, and those values are stored in the memory apparatus 270. The memory apparatus 270 may also be an external storage apparatus of the microprocessor 250.

Next, an explanation is provided of an example of the operation of the microprocessor 250. The case of input of a command "LUOP d, s1, s2", for example, is explained. This command indicates that outputs $b_0$ to $b_{N-1}$ are calculated from register values represented by operand "s1" ($p_{-1}$ to $p_{N-1}$, $q_0$ to $q_{N-2}$) and register values represented by operand "s2" ($a_{-N}$ to $a_{-1}$, $a_0$ to $a_{N-1}$), and that a value obtained by articulating N bit "0" superordinate to that value is written to a register represented by operand "d".

This command is input to the function unit 258 through the command fetcher 251, the command decoder 253 and the immediate value generation unit 254 and the like. The function unit 258 refers to the data address and reads out the required value from the memory apparatus 270. The read value is then stored in the register file 257 via the d bus.

The matrix calculation apparatus 230 reads out characteristic polynomial coefficient p values $p_{-1}$ to $p_{N-1}$ and q values of $q_0$ to $q_{N-2}$ via the s1 bus from the register file 257, and then reads out input values a (input data $a_{-N}$ to $a_{-1}$, $a_0$ to $a_{N-1}$) via the S2 bus. The matrix calculation apparatus 230 then outputs output values $b_0$ to $b_{N-1}$ in the same manner as the previously described example (FIG. 2). Since 2N bit data (both p and q values and input values a are 2N bits) is handled on the d bus (to facilitate storage in the memory apparatus 270), the bit string concatenation unit 256 articulates the N bit "0" to the superordinate bit and outputs to the d bus for output values $b_0$ to $b_{N-1}$ of the matrix calculation apparatus 230. Values that have been output to the d bus are stored in the register file 257.

Output values stored in the register file in this manner are output to the memory apparatus 270 through the function unit 258 by subsequently issuing a store command for storing register values in memory. Output values converted by scrambling input values in the same manner as in the previously described example are stored in the memory apparatus 270.

FIG. 14 is another example of the configuration of the linear feedback shift calculation apparatus 20. In this configuration, the microprocessor 250 is further provided with the matrix calculation apparatus 230, a $p_{-1}$ value generation unit 261, a bit string concatenation unit 262 and a pq register 263.

The $p_{-1}$ value generation unit 261 generates a $p_{-1}$ value (=0 or 1) among the p values that corresponds to a command decoded by the command decoder 253, and outputs that value to the bit string concatenation unit 262.

The bit string concatenation unit 262 articulates the output (q value) of the L generation unit 210, the input (characteristic polynomial coefficient p value) and the $p_{-1}$ value, and outputs to the pq register 263.

The pq register 263 then holds the pq value ($p_{-1}$ to $p_{N-1}$, $q_0$ to on $q_{N-1}$).

Next, an explanation is provided of the operation. Operation is explained using an example of three commands. The first command is a "GENL0 s1" command. This command calculates a q value of $q_0$ to $q_{N-1}$ using a register value represented by the operand "s1" ($p_0$ to $p_{N-1}$), articulates this q value, the $p_{N-1}$ value (=0) and register values $p_0$ to $p_{N-1}$ and writes this articulated value to the pq register 263.

The input data (including input data a and characteristic polynomial coefficient p) is written to the function unit 258, the d bus and the register file 257. The L generation apparatus 210 reads out p values $p_0$ to $p_{N-1}$ from the register file 257 via the s1 bus and outputs q values $q_0$ to $q_{N-1}$. The bit string concatenation unit 256 articulates the outputs $q_0$ to $q_{N-1}$ of the L generation apparatus 210, p values $p_0$ to $p_{N-1}$ and the $p_{-1}$ value (=0) and writes these values to the pq register 263.

The second command is "GENL1 s1". This command is the same as the command "GENL0 s1" except that the $p_{-1}$ value (=1) is different.

The third command is "LOUP d, s1, s2". An explanation of the operation is as follows. The matrix calculation apparatus 230 reads out input data $a_0$ to $a_{N-1}$ via the s1 bus from the register file 257, reads out input $a_{-N}$ to $a_{N-1}$ via the s2 bus from the register file 257, reads out pq values ($q_0$ to $q_{N-1}$, $p_{-1}$ to $p_{N-1}$) from the pq register 263, calculates output $b_0$ to $b_{N-1}$ and writes the results to the register file 257 via the d bus. The output $b_0$ to $b_{N-1}$ written in the register file 257 is then output to the outside via the function unit 258. The data output is converted by scrambling the data input.

FIG. 15 depicts another example of the configuration of the linear feedback shift calculation apparatus 20. Similar to the previously described examples, the microprocessor 250 is provided with the L generation apparatus 210 and the matrix calculation apparatus 230, and bit string concatenation units 262 and 256 are respectively provided on the output side of the L generation apparatus 210 and the matrix calculation apparatus 230.

The following provides an explanation of operation using two commands. The first command is "GENL d, s1". The L generation apparatus 210 reads out a value represented by "s1" (p values $p_{-1}$ to $p_{N-1}$) from the register file 257 via the s1 bus, and calculates a q value of $q_0$ to $q_{N-2}$. The bit string concatenation unit 262 then articulates this q value of $q_0$ to $q_{N-2}$ with the p value of $p_{-1}$ to $p_{N-1}$ and writes to the register file 257 represented by "d" via the d bus.

The second command is "LUOP d, s1, s2". The matrix calculation apparatus 230 reads out data represented by "s1" (input data $a_{-N}$ to $a_{-1}$, $a_0$ to $a_{N-1}$) from the register file 257 via the s1 bus, reads out values represented by "s2" (p values of $p_{-1}$ to $p_{N-1}$, q values of $q_0$ to $q_{N-2}$) from the register file 257 via the s2 bus, and then calculates output $b_0$ to $b_{N-1}$. The bit string concatenation unit 256 then articulates the N bit "0" superordinate to the output $b_0$ to $b_{N-1}$ and writes to the register file 257 via the d bus.

The output data written to the register file 257 is data that has been converted by scrambling the input data, and is output to the outside via the function unit 258 by subsequently issuing a store command and the like for storing register values in memory.

In the examples described above, the digital transmission and reception apparatus 1 has been explained using the example of containing a sending side (transmission frame assembly unit 10 to modulation-demodulation parameter selection circuit 60) and a receiving side (CPU 40 to transmission frame disassembly unit 75). However, the invention can also be carried out with the digital transmission and reception apparatus 1 containing only a sending side or a receiving side.

A data transmission method in a communication apparatus having a small delay, a communication apparatus, a linear feedback shift calculation apparatus and a microprocessor can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A linear feedback shift calculation apparatus, into which input data is input, and which outputs output data, comprising:

an L generation unit which generates q values of $q_0$ to $q_{N-2}$ represented by:

$$q_k = \begin{cases} p_0 & (k=0) \\ p_k + \sum_{i=0}^{k-1} q_{k-1-i} \times p_i & (1 \leq k \leq N-2) \end{cases} \quad \text{Equation 35}$$

(where, $p_0, p_1, \ldots, p_{N-1}, q_0, q_1, \ldots, q_{N-2}$ belong to Galois field GF(2)) from coefficients $p_0$ to $p_{N-2}$ among inputted coefficients $p_{-1}$ to $p_{N-1}$ (wherein, N is a natural number of 2 or more), and stores the q values of $q_0$ to $q_{N-2}$ in a memory; and a matrix calculation unit which outputs the output data calculated from the output data $b_0$ to $b_{N-1}$ represented by:

$$\begin{pmatrix} b_{N-1} \\ b_{N-2} \\ \vdots \\ b_0 \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 36}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 37}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$.

2. The linear feedback shift calculation apparatus according to claim 1, wherein the L generation unit is input with the coefficients $p_{-1}$ to $p_{N-1}$ by reading out the coefficients $p_{-1}$ to $p_{N-1}$ stored in the memory.

3. The linear feedback shift calculation apparatus according to claim 1, wherein the coefficients $p_{-1}$ to $p_{N-1}$ are values corresponding to a communication format for transmitting the output data.

4. The linear feedback shift calculation apparatus according to claim 1, wherein the input data is data contained in a transmission frame assembled from transmission information, and a transmission frame containing the output data is transmitted via a channel after modulation.

5. The linear feedback shift calculation apparatus according to claim 1, wherein the input data is data contained in a transmission frame obtained by demodulating reception data received via a channel, and reception data is obtained from a transmission frame containing the output data.

6. A communication apparatus, comprising:

a transmission frame assembly unit which assembles a transmission frame from transmission information;

a linear feedback shift calculation unit which outputs output data $b_0$ to $b_{N-1}$ from input data $a_{-N}$ to $a_{-1}$ (where, N is a natural number of 2 or more) contained in the transmission frame and inputted coefficients $p_{-1}$ to $p_{N-1}$; and a modulation unit which modulates the transmission frame containing the output data $b_0$ to $b_{N-1}$, wherein the linear feedback shift calculation unit including:

an L generation unit which generates q values of $q_0$ to $q_{N-2}$ represented by:

$$q_k \begin{cases} p_0 & (k = 0) \\ p_k + \sum_{i=0}^{k-1} q_{k-1-i} \times p_i & (1 \le k \le N-2) \end{cases} \quad \text{Equation 38}$$

(where, $p_0, p_1, \ldots, p_{N-1}, q_0, q_1, \ldots, q_{N-2}$ belong to Galois field GF(2)) from coefficients $p_0$ to $p_{N-2}$ among the coefficients $p_{-1}$ to $p_{N-1}$, and stores the q values of $q_0$ to $q_{N-2}$ in a memory; and a matrix calculation unit which calculates and outputting the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 39}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 40}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$.

7. A communication apparatus, comprising:

a demodulation unit which outputs a transmission frame by demodulating reception data, a linear feedback shift calculation unit which outputs output data $b_0$ to $b_{N-1}$ from input data $a_{-N}$ to $a_{-1}$ (where, N is a natural number of 2 or more) contained in the transmission frame and inputted coefficients $p_{-1}$ to $p_{N-1}$; and a transmission frame disassembly unit which outputs reception information from a transmission frame containing the output data $b_0$ to $b_{N-1}$, wherein the linear feedback shift calculation unit including:

an L generation unit which generates q values of $q_0$ to $q_{N-2}$ represented by:

$$q_k \begin{cases} p_0 & (k = 0) \\ p_k + \sum_{i=0}^{k-1} q_{k-1-i} \times p_i & (1 \le k \le N-2) \end{cases} \quad \text{Equation 41}$$

Equation 41

(where, $p_0, p_1, \ldots, p_{N-1}, q_0, q_1, \ldots, q_{N-2}$ belong to Galois field GF(2)) from coefficients $p_0$ to $p_{N-2}$ among the coefficients $p_{-1}$ to $p_{N-1}$, and stores the q values of $q_0$ to $q_{N-2}$ in a memory; and a matrix calculation unit which calculates and outputting the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 42}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 43}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$.

8. A microprocessor, comprising:

an L generation unit which generates q values of $q_0$ to $q_{N-2}$ represented by:

$$q_k \begin{cases} p_0 & (k = 0) \\ p_k + \sum_{i=0}^{k-1} q_{k-1-i} \times p_i & (1 \le k \le N-2) \end{cases} \quad \text{Equation 44}$$

Equation 44

(where, $p_0, p_1, \ldots, p_{N-1}, q_0, q_1, \ldots, q_{N-2}$ belong to Galois field GF(2)) from coefficients $p_0$ to $p_{N-2}$ among inputted coefficients $p_{-1}$ to $p_{N-1}$ (where, N is a natural number of 2 or more), and stores the q values of $q_0$ to $q_{N-2}$ in a memory; and a matrix calculation unit which calculates and outputting output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 45}$$

-continued $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix}$$ Equation 46

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$.

9. A microprocessor, comprising:
a matrix calculation unit which reads out q values $q_0$ to $q_{N-2}$ represented by:

$$q_k = \begin{cases} p_0 & (k=0) \\ p_k + \sum_{i=0}^{k-1} q_{k-1-i} \times p_i & (1 \leq k \leq N-2) \end{cases}$$ Equation 47

(where, $p_0, p_1, \ldots, p_{N-1}, q_0, q_1, \ldots, q_{N-2}$ belong to Galois field GF(2)), for coefficients $p_0$ to $p_{N-2}$ among inputted coefficients $p_{-1}$ to $p_{N-1}$ (where, N is a natural number of 2 or more), and the coefficients $p_{-1}$ to $p_{N-1}$ from an external storage apparatus, and outputting the output data calculated from the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right)$$ Equation 48 and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix}$$ Equation 49

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$, the coefficients $p_{-1}$ to $p_{N-1}$ and the input data $a_{-N}$ to $a_{-1}$, $a_0$ to $a_{N-1}$.

10. A method for outputting data in a linear feedback shift calculation apparatus, the method comprising:
generating q values $q_0$ to $q_{N-2}$ represented by:

$$q_k = \begin{cases} p_0 & (k=0) \\ p_k + \sum_{i=0}^{k-1} q_{k-1-i} \times p_i & (1 \leq k \leq N-2) \end{cases}$$ Equation 50

(where, $p_0, p_1, \ldots, p_{N-1}, q_0, q_1, \ldots, q_{N-2}$ belong to Galois field GF(2)), from coefficients $p_0$ to $p_{N-2}$ among inputted coefficients $p_{-1}$ to $p_{N-1}$ (where, N is a natural number of 2 or more), and storing the q values $q_0$ to $q_{N-2}$ in a memory, by an L generation unit of the linear feedback shift calculation apparatus; and
calculating and outputting the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right)$$ Equation 51 and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix}$$ Equation 52

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$ by a matrix calculation unit of the linear feedback shift calculation apparatus.

11. A data transmission method in a communication apparatus containing a linear feedback shift calculation apparatus, the method comprising:
assembling a transmission frame from transmission information;
outputting output data $b_0$ to $b_{N-1}$ from input data $a_{-N}$ to $a_{-1}$ (where, N is a natural number of 2 or more) contained in the transmission frame and inputted coefficients $p_{-1}$ to $p_{N-1}$ by the linear feedback shift calculation apparatus; and
modulating the transmission frame containing the output data $b_0$ to $b_{N-1}$, wherein
the outputting step including:
generating q values $q_0$ to $q_{N-2}$ represented by:

$$q_k = \begin{cases} p_0 & (k=0) \\ p_k + \sum_{i=0}^{k-1} q_{k-1-i} \times p_i & (1 \leq k \leq N-2) \end{cases}$$ Equation 53

(where, $p_0, p_1, \ldots, p_{N-1}, q_0, q_1, \ldots, q_{N-2}$ belong to Galois field GF(2)), from coefficients $p_0$ to $p_{N-2}$ among the coefficients $p_{-1}$ to $p_{N-1}$, and storing the q values $q_0$ to $q_{N-2}$ in a memory, by an L generation unit contained in the linear feedback shift calculation apparatus; and calculating and outputting the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 54}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 55}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$ by a matrix calculation unit contained in the linear feedback shift calculation apparatus.

12. A data reception method in a communication apparatus containing a linear feedback shift calculation apparatus, the method comprising:

outputting a transmission frame by demodulating reception data;

outputting output data $b_0$ to $b_{N-1}$ from input data $a_{-N}$ to $a_{-1}$ (where, N is a natural number of 2 or more) contained in the transmission frame and inputted coefficients $p_{-1}$ to $p_{N-1}$ by the linear feedback shift calculation apparatus; and outputting reception information from a transmission frame containing the output data $b_0$ to $b_{N-1}$, wherein the outputting step including:

generating q values $q_0$ to $q_{N-2}$ represented by:

$$q_k = \begin{cases} p_0 & (k = 0) \\ p_k + \sum_{i=0}^{k-1} q_{k-1-i} \times p_1 & (1 \leq k \leq N-2) \end{cases} \quad \text{Equation 56}$$

(where, $p_0, p_1, \ldots, p_{N-1}, q_0, q_1, \ldots, q_{N-2}$ belong to Galois field GF(2)), from coefficients $p_0$ to $p_{N-2}$ among the coefficients $p_{-1}$ to $p_{N-1}$, and storing the q values $q_0$ to $q_{N-2}$ in a memory, by an L generation unit contained in the linear feedback shift calculation apparatus; and calculating and outputting the output data $b_0$ to $b_{N-1}$ represented by:

$$\begin{pmatrix} b_{N-1} \\ b_{N-2} \\ \vdots \\ b_o \end{pmatrix} = L \times \left( U \times \begin{pmatrix} a_{N-1} \\ a_{N-2} \\ \vdots \\ a_0 \end{pmatrix} + p_{-1} \times \begin{pmatrix} a_{-1} \\ a_{-2} \\ \vdots \\ a_{-N} \end{pmatrix} \right) \quad \text{Equation 57}$$

and $$L = \begin{pmatrix} 1 & 0 & \cdots & 0 & 0 & 0 \\ q_0 & 1 & 0 & \cdots & 0 & 0 \\ q_1 & q_0 & 1 & 0 & \cdots & 0 \\ \vdots & & \ddots & \ddots & \ddots & \vdots \\ q_{N-3} & q_{N-4} & \cdots & q_0 & 1 & 0 \\ q_{N-2} & q_{N-3} & \cdots & q_1 & q_0 & 1 \end{pmatrix} \quad \text{Equation 58}$$

$$U = \begin{pmatrix} p_{N-1} & p_{N-2} & \cdots & p_2 & p_1 & p_0 \\ 0 & p_{N-1} & p_{N-2} & \cdots & p_2 & p_1 \\ 0 & 0 & p_{N-1} & p_{N-2} & \cdots & p_2 \\ \vdots & & \ddots & \ddots & \ddots & \vdots \\ 0 & 0 & \cdots & 0 & p_{N-1} & p_{N-2} \\ 0 & 0 & \cdots & 0 & 0 & p_{N-1} \end{pmatrix}$$

from the q values $q_0$ to $q_{N-2}$ read out from the memory, the coefficients $p_{-1}$ to $p_{N-1}$ and the input data $a_{-N}$ to $a_{-1}$, $a_0$ to $a_{N-1}$ by a matrix calculation unit contained in the linear feedback shift calculation apparatus.

\* \* \* \* \*